(No Model.) 2 Sheets—Sheet 1.

F. M. UNDERWOOD.
CYLINDER HEAD FOR GAS OR GASOLINE ENGINES.

No. 542,743. Patented July 16, 1895.

(No Model.) 2 Sheets—Sheet 2.

F. M. UNDERWOOD.
CYLINDER HEAD FOR GAS OR GASOLINE ENGINES.

No. 542,743. Patented July 16, 1895.

Attest.
Edw. P. Duvall Jr.
D. P. Moore.

Frank M. Underwood,
Inventor.
by Wm. N. Moore,
Atty.

UNITED STATES PATENT OFFICE.

FRANK M. UNDERWOOD, OF UPPER SANDUSKY, OHIO.

CYLINDER-HEAD FOR GAS OR GASOLINE ENGINES.

SPECIFICATION forming part of Letters Patent No. 542,743, dated July 16, 1895.

Application filed March 14, 1895. Serial No. 541,702. (No model.)

*To all whom it may concern:*

Be it known that I, FRANK M. UNDERWOOD, a citizen of the United States, residing at Upper Sandusky, in the county of Wyandot and State of Ohio, have invented certain new and useful Improvements in Cylinder-Heads for Gas or Gasoline Engines; and I do hereby declare the following to be a full, clear, and exact description of the invention, such as will enable others skilled in the art to which it appertains to make and use the same.

My invention relates to improvements in gas and gasoline engines, and refers especially to what may be termed the "cylinder-head," the object being the provision of a cylinder-head of simple and inexpensive construction, which can be easily removed from the cylinder or applied, as desired, which can be used with water or air, as found necessary and desirable, and which will be thoroughly efficient and practical for the intended purpose.

The invention consists of a cylinder embodying novel features of construction and combination of parts for service, substantially as disclosed herein.

Figure 1:
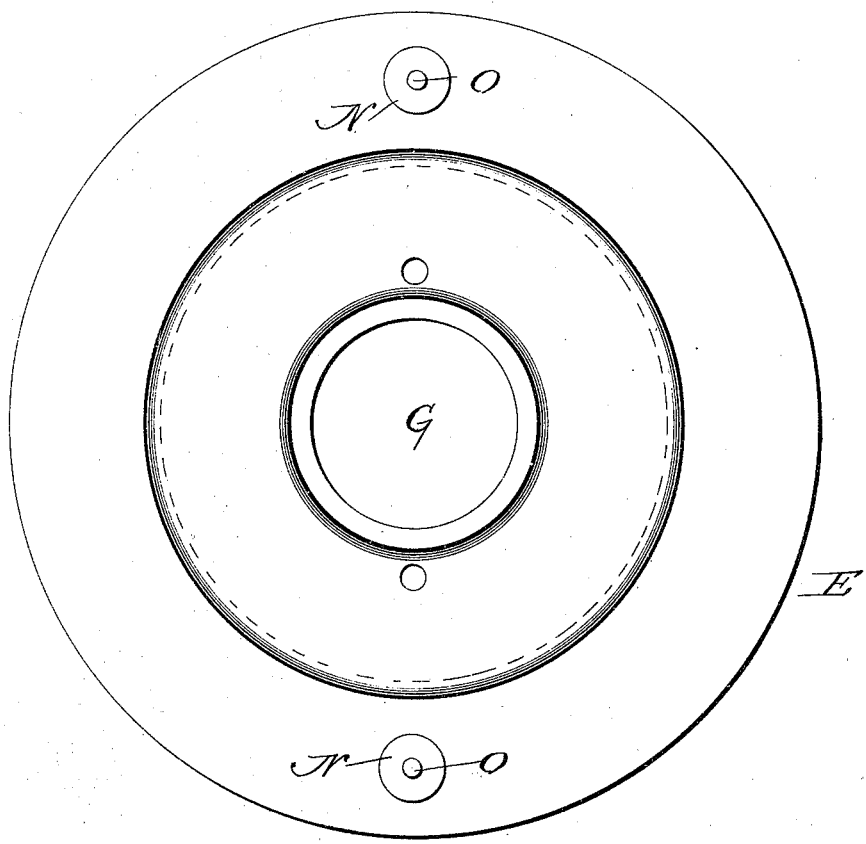
Figure 2:
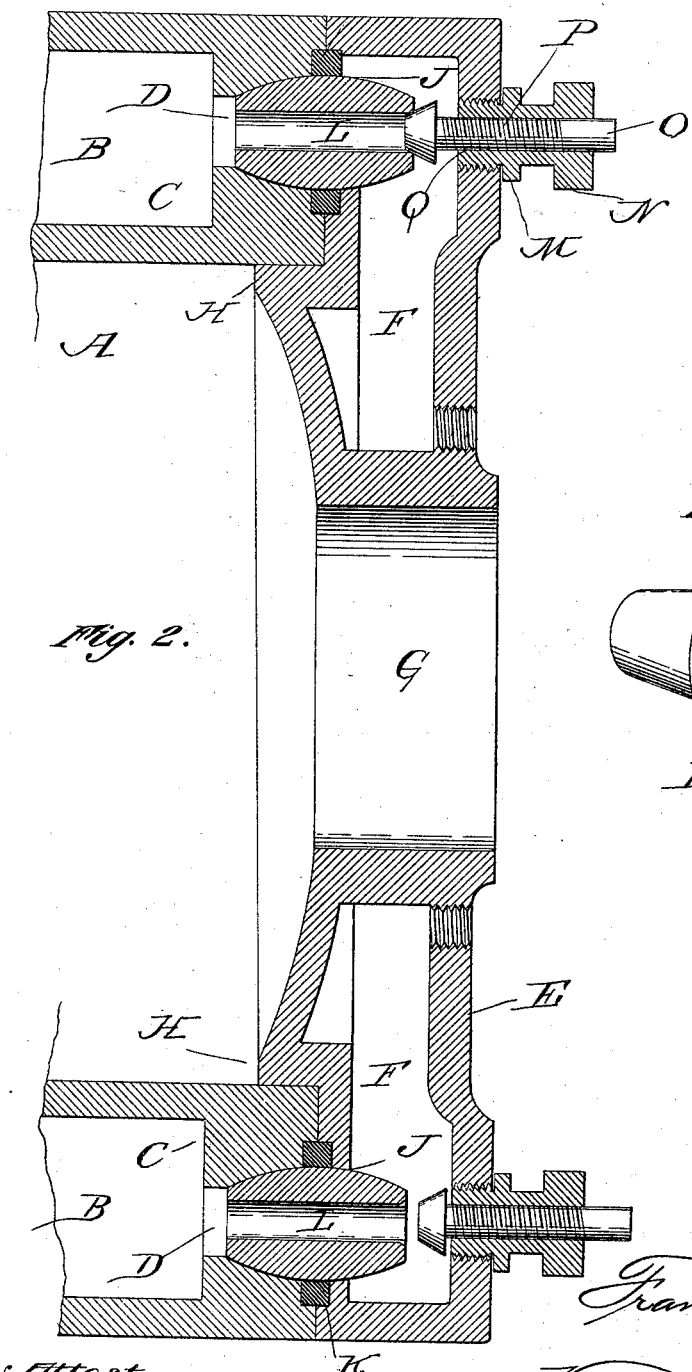
Figure 3:
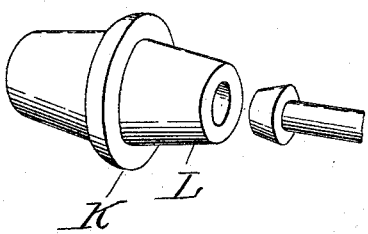

Figure 1 represents an end elevation or face view of my improved cylinder-head. Fig. 2 represents a vertical central sectional view thereof, showing the adjustment of the valves for the use of water or air; and Fig. 3 represents a perspective view of one of the connecting-sleeves and screw-valves therefor.

In the drawings, A designates the cylinder proper, which is formed with the water or air jacket or space B, having in its end wall C the openings or passages D, which are cup-shaped or rounding.

To the cylinder proper is secured or fitted the cylinder-head E, which is provided with the chambers or spaces or compartments F and with the central opening G, in which is placed or fitted the sparking or igniting mechanism, and the head is further provided with the shouldered portion or rim H, which fits in the cylinder, and with the openings J, which communicate with the jackets of the cylinder and are of a similar rounding or cupped shape. The meeting edges of the cylinder and head, around the openings before mentioned, are provided with grooves, forming a seat for the gasket or rubber or elastic packing-rings K, in which are placed the rounded sleeves or tubes L, which closely fit the openings of the jackets or spaces of the cylinder and head, and thus form a communicating connection between the cylinder and head. In the outer wall of the cylinder-head and in line with said tubes or sleeves are made the openings M, which are threaded to receive the plugs or caps N, which form bearings for the screw valves or cocks O, said screw-valves having the threaded stems P, which engage threads Q in said plugs, and it will be seen that the valves may be adjusted to close the tubes or sleeves and prevent the entrance of air or water to the jackets of the head from the jackets of the cylinder. From this construction it will be seen that the cylinder-head can be easily applied to the cylinder, and yet a perfect joint is provided between the parts, and also that the jackets or chambers of the cylinder and head may be made to communicate or be closed by means of the screw-valves.

I claim—

1. The combination of the cylinder having the surrounding space or jacket, the cylinder head having the jackets or spaces communicating with the jacket of the cylinder, the tubes or sleeves for securing the head to the cylinder, and also forming the communication between the same, and the valves for controlling the communication between the cylinder and head.

2. The combination with the cylinder having the surrounding jacket, the cylinder head having the chambers or jackets communicating with the jacket of the cylinder, the gaskets or packings secured in the meeting edges of the cylinder and head, the rounded tubes or sleeves seated in said gaskets and forming a communicating connection between the cylinder and head, and the adjustable valves for controlling the communication through said tubes or sleeves.

In testimony whereof I affix my signature in presence of two witnesses.

FRANK M. UNDERWOOD.

Witnesses:
J. M. STEVENSON,
WARNER CLARK.